US011658817B2

(12) United States Patent
Laselva et al.

(10) Patent No.: US 11,658,817 B2
(45) Date of Patent: May 23, 2023

(54) SECURITY KEY USAGE ACROSS HANDOVER THAT KEEPS THE SAME WIRELESS TERMINATION

(71) Applicant: Nokia Technologies Oy, Espoo (FI)

(72) Inventors: Daniela Laselva, Klarup (DK); Istvan Z. Kovacs, Aalborg (DK)

(*) Notice: Subject to any disclaimer, the term of this patent is extended or adjusted under 35 U.S.C. 154(b) by 426 days.

(21) Appl. No.: 16/877,684

(22) Filed: May 19, 2020

(65) Prior Publication Data

US 2020/0280848 A1 Sep. 3, 2020

Related U.S. Application Data

(63) Continuation of application No. 15/491,014, filed on Apr. 19, 2017, now Pat. No. 10,681,541.

(Continued)

(51) Int. Cl.
*H04L 9/08* (2006.01)
*H04L 9/14* (2006.01)
(Continued)

(52) U.S. Cl.
CPC ............ *H04L 9/088* (2013.01); *H04L 9/0891* (2013.01); *H04L 9/14* (2013.01); *H04W 12/04* (2013.01); *H04W 12/041* (2021.01); *H04W 12/0433* (2021.01); *H04W 12/06* (2013.01); *H04W 12/40* (2021.01); *H04W 36/0038* (2013.01); *H04L 2209/80* (2013.01); *H04W 12/033* (2021.01); *H04W 12/037* (2021.01);
(Continued)

(58) Field of Classification Search
CPC ......... H04L 9/0891; H04L 9/14; H04W 12/06

USPC ......................................................... 713/168
See application file for complete search history.

(56) References Cited

U.S. PATENT DOCUMENTS 8,228,861 B1 * 7/2012 Nix ........................ H04L 65/61
370/329
10,736,094 B2 * 8/2020 Xu ..................... H04W 72/0433
(Continued)

FOREIGN PATENT DOCUMENTS

CN 101889423 A 11/2010
CN 102984773 A 3/2013
(Continued)

OTHER PUBLICATIONS

Pavan Nuggehalli; LTE-WLAN Aggregation; IEEE: 2016; pp. 4-6.*
(Continued)

*Primary Examiner* — Monjur Rahim (57) ABSTRACT

A user equipment (UE) has both cellular and non-cellular links. The network sends it a first indication to maintain using a first set of security keys generated from a parameter specific to a source access node after the UE hands over the cellular link to a target access node without changing a wireless termination (WT) that is connected with the UE via the non-cellular link. The network uses that key to maintain the non-cellular link with the UE after the cellular link handover. From the UE's perspective it uses that key to authenticate its non-cellular link prior to the cellular link handover, but this handover does not change the WT which communicates with the UE via the non-cellular link so the UE can, only in response to receiving a first indication associated with the handover, use that same key to maintain that non-cellular link after the handover.

15 Claims, 3 Drawing Sheets

Related U.S. Application Data (60) Provisional application No. 62/329,531, filed on Apr. 29, 2016.

(51) Int. Cl.
*H04W 12/04* (2021.01)
*H04W 84/12* (2009.01)
*H04W 12/06* (2021.01)
*H04W 12/40* (2021.01)
*H04W 12/041* (2021.01)
*H04W 12/0433* (2021.01)
*H04W 36/00* (2009.01)
*H04W 12/033* (2021.01)
*H04W 12/037* (2021.01)
*H04W 12/069* (2021.01)

(52) U.S. Cl.
CPC ...... *H04W 12/069* (2021.01); *H04W 36/0069* (2018.08); *H04W 84/12* (2013.01)

(56) References Cited

U.S. PATENT DOCUMENTS

| | | | |
|---|---|---|---|
| 2008/0175393 A1* | 7/2008 | Oba ................ | H04L 63/062 380/279 |
| 2008/0212783 A1* | 9/2008 | Oba ................ | H04L 63/0807 380/279 |
| 2008/0267407 A1* | 10/2008 | Vanderveen ...... | H04W 12/0433 380/277 |
| 2011/0004760 A1* | 1/2011 | Sharaga ........... | H04W 12/041 713/168 |
| 2012/0159151 A1* | 6/2012 | Janakiraman ..... | H04L 9/0844 713/153 |
| 2012/0163336 A1* | 6/2012 | Adjakple .......... | H04W 12/0433 370/331 |
| 2014/0064068 A1 | 3/2014 | Hom ................ | 370/230 |
| 2014/0211690 A1* | 7/2014 | Nama ............... | H04W 52/26 370/328 |
| 2014/0293970 A1* | 10/2014 | Damnjanovic ..... | H04L 5/0078 370/336 |
| 2015/0094025 A1* | 4/2015 | Chen ................ | H04W 12/041 455/411 |
| 2016/0249210 A1* | 8/2016 | Chang .............. | H04W 12/0431 |
| 2016/0262020 A1 | 9/2016 | Zalzalah | |
| 2017/0257265 A1* | 9/2017 | Hong ............... | H04W 28/18 |
| 2017/0273125 A1* | 9/2017 | Teyeb .............. | H04W 36/0027 |
| 2018/0132143 A1* | 5/2018 | Sirotkin ........... | H04W 72/1215 |
| 2018/0227752 A1 | 8/2018 | Teyeb | |

FOREIGN PATENT DOCUMENTS

| | | |
|---|---|---|
| CN | 103959829 A | 7/2014 |
| CN | 104936174 A | 9/2015 |
| WO | WO-2009/080480 A1 | 7/2009 |
| WO | WO-2014035619 A1 | 3/2014 |
| WO | WO-2015/155599 A2 | 10/2015 |
| WO | WO-2016036296 A1 | 3/2016 |

OTHER PUBLICATIONS

3GPP TS 33.401 V13.2.0, $3^{rd}$ Generation Partnership Project; Technical Specification Group Services and System Aspects; 3GPP System Architecture Evolution (SAE); Security architecture (Release 13), Mar. 2016, 146 pgs.

R3-160626, "Mobility enhancements for LWA", Intel Corporation, 3GPP TSG RAN WG3 Meeting #91bis, Apr. 2016, 6 pgs.

R3-160888, "LTE mobility without WT change", Qualcomm Incorporated, 3GPP TSG-RAN3 Meeting #91bis, Apr. 2016, 3 pgs.

R3-160859, "Handovers without WT Change", Ericsson, 3GPP TSG-RAN WG3 Meeting #91bis, Apr. 2016, 5 pgs.

R2-162793, "Mobility optimizations for eLWA", Ericsson, 3GPP TSG-RAN WG2 #93bis, Apr. 2016, 3 pgs.

R2-162407, "Discussion on Inter-eNB handover without WT change for LTE-WLAN aggregation", China Telecom, 3GPP TSG RAN WG2 Meeting #93bis, Apr. 2016.

Ericsson Mobility Optimizations for eLWA. In: 3GPP Draft; R2-16279 $3^{rd}$ Generation Partnership Project (3GPP), Mobile Competence Centre; 650, route des Lucioles; F-06921 Sophia-Antipolis Cedex; France: Apr. 2, 2016.

ITRI Inter eNB Handover without WT Change to Keep LWA Active. In: 3GPP Draft; R2-166480 $3^{rd}$ Generation Partnership Project (3GPP), Mobile Competence Centre; 650, route des Lucioles; F-06921 Sophia-Antipolis Cedex; France: Oct. 9, 2016.

3GPP TSG RAN WG2 #93bis, R2-163147, Dubrovnik, Croatia, "LS on key change during HO for eLVVA", Apr. 11-15, 2016, 1 page.

3GPP TSG RAN Meeting #71 RP-160600, Goteborg, Sweden, "New Work Item on Enhanced LVVA", Mar. 7-10, 2016 revision of RP-160522, 8 pages.

Samsung; "LTE handover during LTE-WLAN aggregation"; R2-156080; 3GPP TSG-RAN WG2 Meeting #92, Anaheim, US; Nov. 16-20, 2015; whole document (4 pages).

Intel Corporation; "Way Forward on the Handover without WT Change procedure"; R3-160921; 3GPP TSG-RAN3 Meeting #91bis, Bangalore, India; Apr. 11-15, 2016; whole document (2 pages).

* cited by examiner

SECURITY KEY USAGE ACROSS HANDOVER THAT KEEPS THE SAME WIRELESS TERMINATION

This U.S. patent application claims benefit under 35 USC 119(e) and 37 CFR 1.78(a) of non-provisional U.S. patent application Ser. No. 15/491,014 filed on Apr. 19, 2017 which claims benefit of provisional U.S. patent application Ser. No. 62/329,531 filed on Apr. 29, 2016, of which the entire contents thereof is hereby incorporated by reference.

TECHNOLOGICAL FIELD

The described invention relates to wireless communications, and more particularly to ciphering/encryption keys used in wireless communications when a user equipment (UE) hands over from a source access node to a target access node but maintains the same wireless termination (WT), for example in a LTE-WLAN aggregation (LWA) radio environment.

BACKGROUND

Generally when a user equipment (UE) in a connected state moves from one cellular access node such as an eNB to another, new security/encryption keys are used after the changeover. At the same time, more ubiquitous wireless local area networks WLANs in combination with the public's increasing awareness of communications security has driven greatly improved security for IEEE 802.11 type radio access technologies. Future implementations of the LTE cellular radio access technology are to include LTE-WLAN aggregation (LWA) in which a cellular eNB can mute some of the traffic (PDCP PDUs) for a given UE's bearer to a WLAN access point (AP) to which the UE has a simultaneous connection. In LWA there is a wireless termination (WT) which is a logical node that terminates the Xw interface and is in control of one or more WLAN APs, so a given UE's WLAN connection can hand over from one AP to another without the UE changing its WT, depending on the APs involved. Similarly, in LWA it is also possible for the UE's cellular connection to hand over from one eNB to another without changing its WT; this can occur even when the UE's WLAN connection is also handed over to another AP so long as the source and target APs are under the same WT.

With respect to LWA in Rel-13 of LTE, at the eNB handover the LWA configuration of the source eNB is released and the UE should release any existing encryption keys it has. This is because the relevant encryption keys, including the key S-$K_{WT}$ which is a WLAN security key used for the cellular link, are based on the eNB-specific key $K_{eNB}$ which in this handover case would be associated with the source eNB that the UE is no longer associated to after the hand over. The target eNB would then send a brand new LWA configuration with its own $K_{eNB}$ to the UE after the handover. If the target eNB wishes to use eNB-based WLAN authentication it would have to include a parameter called WT counter as part of the new LWA configuration it gives to the UE since this is used along with the parameter $K_{eNB}$ to derive the key S-$K_{WT}$ that is also used for WLAN authentication (in this regard it functions similar to the IEEE pairwise master key PMK). The UE will then compute the key S-$K_{WT}$ based on the $K_{eNB}$ of the target eNB, and also based on the WT counter parameter in the new LWA configuration the target eNB signals to the UE. The same applies to the packet data convergence protocol (PDCP) encryption keys since the PDCP ciphering key also changes upon handover based on the eNB-specific value $K_{eNB}$. The PDCP ciphering key enables the WT and AP to send to the UE packets that are forwarded to the WT from the eNB.

While the above eNB-based WLAN authentication method that is defined in the Rel-13 LWA specifications of LTE is intended to be and in fact may be faster than legacy authentication methods based on EAP/AKA 802.1x/AAA, the inventors have found a way to improve it even further as set forth below. While LWA is the specifically described example the broader teachings herein are not limited only to the LWA radio technology environment. For example, the development of 5G cellular radio access technologies is expected to have a cellular-WLAN integration for simultaneously serving a given UE and it is certain to include robust security features to which these teachings can be applied; or these teachings can be implemented with other integrations of different radio access technologies (RATs).

DETAILED DESCRIPTION

The description below assumes LWA radio technology environment for clarity of explanation, but it will be apparent that these LWA specific examples are readily extendable to more general radio environments in which the UE's bearer is handed over from a source access node that uses one security key or set of keys to a target access node that uses a different security key or set of keys for packet ciphering/deciphering and/or link authentication.

Specific to LWA, a new work item for "enhanced LWA" has been approved by the RAN2 in March 2016 [see specifically document RP-160600 by Intel Corp, Qualcomm, Inc., and China Telecom entitled "New Work Item on Enhanced LWA"; 3GPP TSG RAN Meeting #71; Gotenborg, Sweden; 7-10 Mar. 2016]. One objective there is mobility optimizations such as intra and inter eNB handovers without a WT change which is satisfied by certain embodiments described herein.

Consider more specifies of the REL. 13 LWA security features. The eNB (specifically, the master eNB or MeNB in LWA parlance) is in charge of creating and updating the master key used for WLAN security (for example, for authentication and encryption). Unless specified otherwise, eNB as used in the examples below refers to a MeNB. 3GPP TS 33.401 and TS 36.331 set forth the following specific procedures concerning the encryption master key S-$K_{WT}$:

The eNB derives the master key S-$K_{WT}$ based on $K_{eNB}$ and WT Counter,

The eNB sends S-K$_{WT}$ to the WT via a secure Xw interface, and then the WT makes it available to APs/ACs which belong to the UE's WLAN mobility set (this is configured for the UE in the LWA configuration);

The UE derives the same S-K$_{WT}$ key autonomously (also based on based K$_{eNB}$ and on WT Counter that the UE receives from its eNB);

The master key S-K$_{WT}$ is then used by the UE as the Pairwise Master Key (PMK) for a 4-way handshake as defined in IEEE 802.11 specifications (for example, 802.11ax, 802.11ad, 802.11ay, etc.).

In Rel-13, the eNB can update S-K$_{WT}$ by incrementing the WT Counter (in this regard it is considered a refresh parameter) and computing a new S-K$_{WT}$. Also, at any handover event the LWA data radio bearer (DRB, as opposed to a signaling radio bearer SRB) connection between the UE and the WT (via the AP if the WT and AP are not co-located) is released and the UE shall delete the S-K$_{WT}$ and further keys derived based on it. But there are unresolved questions for how security is to be handled for enhanced LWA (eLWA) in Rel-14 as set forth in document R2-163147 by RAN WG2 entitled "LS on key change during HO for eLWA (3GPP TSG RAN WG2 #93bis; Dubrovnik, Croatia; 11-15 Apr. 2016).

Specifically, if the UE performs a handover and K$_{eNB}$ is changed while the UE remains connected to WLAN associated with the same WT, is it acceptable for the UE to retain the existing S-K$_{WT}$ after handover? Also, if it is necessary for the UE to replace the key with a new S-K$_{WT}$ derived from the new K$_{eNB}$, then RAN2 would like SA3 to consider feasible solutions for Rel-14 eLWA potentially allowing the UE to remain associated with the WLAN after intra/inter-eNB handover.

In Rel-13 LWA as mentioned above, at the eNB handover the LWA configuration of the source eNB is released and the UE should release any existing S-K$_{WT}$ key. But the cellular link to the source eNB is broken before that link is established with the target eNB, and so the unintended result of releasing the existing S-K$_{WT}$ key without being able to compute a new one would lead to the UE not being able to authenticate with the WLAN AP. Any data packets that are buffered at the WT/AP would need to be discarded after the LWA configuration is released at the UE since such a release would result in termination of the WLAN link that was earlier aggregated to the LTE source eNB. The target eNB would have to send a brand new LWA configuration to the UE after the handover. If the target eNB wishes to use eNB-based WLAN authentication it would have to include the WT counter parameter as part of the configuration. The UE will then compute the S-K$_{WT}$ key based on the K$_{eNB}$ parameter of the target eNB and the signaled WT counter but by then the WLAN link may have already been terminated due to lack of authentication, absent the advantages of these teachings. The same applies to the PDCP encryption keys since the PDCP ciphering key (for packet encryption/decryption) also changes upon handover based on the current K$_{eNB}$ parameter which is eNB-specific.

In one aspect of these teachings the security solution for Rel-13 LWA is updated to retain the existing S-K$_{WT}$ and PDCP keys (which pre-handover are derived based on the K$_{eNB}$ of the source eNB) after the handover to the target eNB when this handover occurs without a change to the UE's WT. Relatedly these teachings also address how and when to enforce the use of the new S-K$_{WT}$ and/or PDCP keys (which post-handover are based on the K$_{eNB}$ of the target eNB).

While the LTE link undergoes a handover this implies a short data interruption (sometimes referred to as a break-before-make approach since the link to the source eNB is broken slightly before the link to the target eNB is made). But during this short data interruption the WLAN link (same WT-UE) can be maintained and the UE that is configured with LWA can still be served data over its WLAN link during the eNB handover so long as there is no change to the UE's WLAN WT during the cellular handover. In this scenario there is no interruption of the data link to/from the UE because the WLAN link remains connected. But as mentioned above, in the Rel-13 security procedures deleting the existing S-K$_{WT}$ upon the cellular link hand over may make the WLAN link not usable for some time period for data (except without encryption which is not allowed in LWA specifications). Apart from the key generation itself the relevant security procedures entail a 4-way authentication handshake (which proves the participants have the key but does not actually involve exchanging that key) so in wireless communication terms this time period is not negligible. As detailed herein, retaining that S-K$_{WT}$ key can keep the LWA WLAN link intact across the break-before-make cellular link hand over because then this handshake will remain valid.

Retaining the existing/pre-handover S-K$_{WT}$ and PDCP keys after the handover to the target eNB means for example that the packets from the source eNB that may be buffered at the WT/AP will not need to be discarded at the cellular handover event; they could still be delivered to the UE via the WT over the intact WLAN link and still be correctly decoded by the UE even after the cellular handover is complete.

If it were otherwise and the WT would not be able to deliver those buffered packets, the source eNB would need to be much more conservative about routing data to the WLAN AP immediately prior to and during the cellular handover, which would generate inefficiencies in the data throughput.

Figure 1:
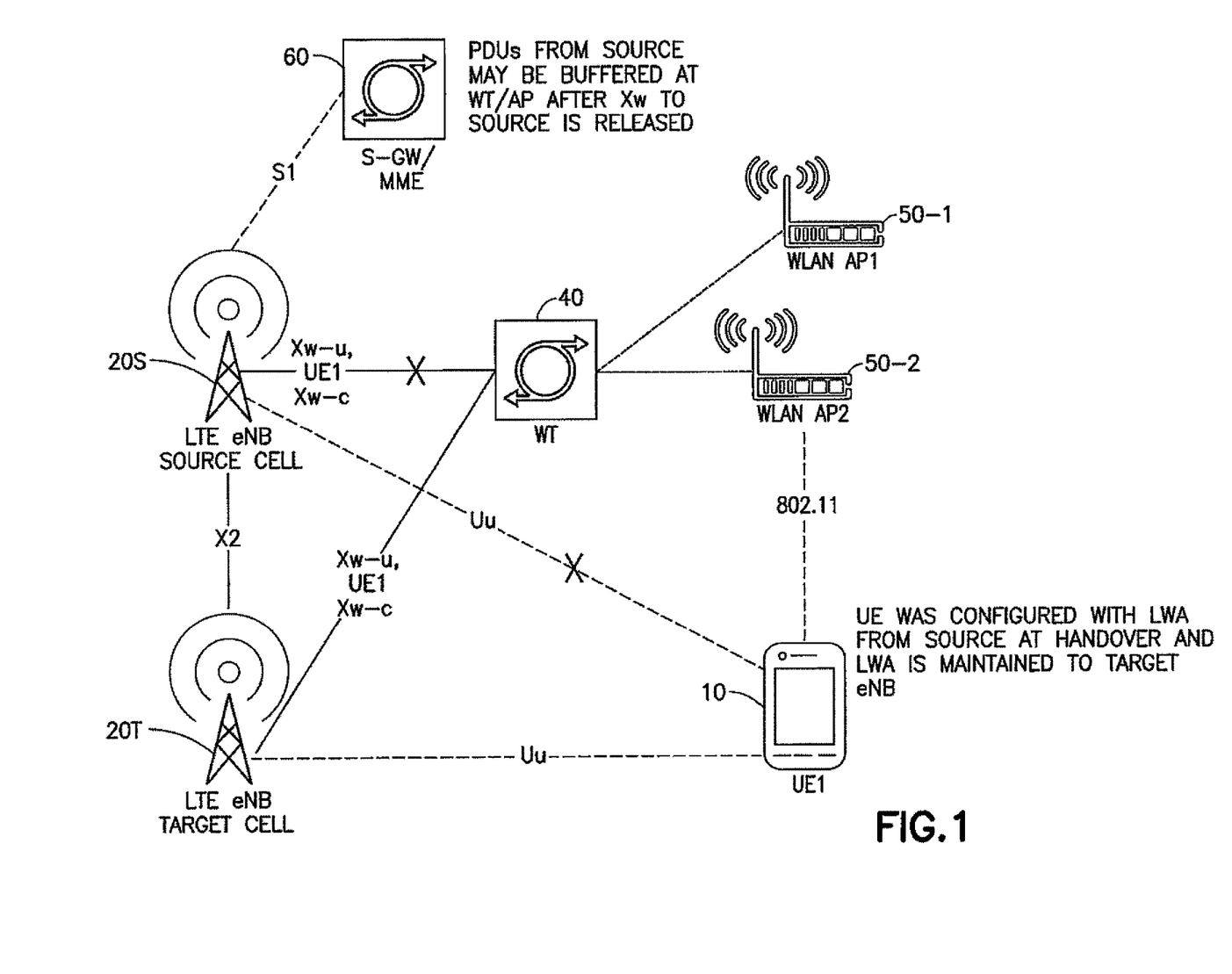
FIG. 1 is a schematic diagram of a radio environment in which these teachings may be practiced to advantage, namely a LWA radio environment in which a UE hands over from source to target eNBs without changing its WLAN wireless termination.

FIG. 1 is a schematic diagram of a UE 10 in a LWA environment and handing over from a source eNB 20S to a target eNB 20T without changing its WT 40 to which it is connected via a WLAN AP 50-2. In this case there is also one other WLAN 50-1 within the mobility set that is configured for the UE but that AP 50-2 is not relevant for this example. For completeness FIG. 1 also shows a serving gateway (S-GW) 60 that also handles functions of the mobility management entity (MME), which is connected to the eNBs 20S, 20T via a S1 interface.

The X2 interface goes between the two eNBs 20S, 20T. User and control plane interfaces between the WT 40 and these eNBs 20S, 20T are marked as XW-u and XW-c, respectively. The UE 10 has a connection with the AP 50-2 using 802.11 radio access technology, and its connection with the eNBs 20S, 20T uses LTE technology (shown as a Uu interface for user data). In the break-before-make cellular handover, the UE's Uu interface with the source eNB 20S is broken before it establishes a new Uu interface with the target eNB 20T, but across this break the 802.11 link with the WT 40 via a single AP 50-2 as shown remains viable for the LWA networking arrangement to send data to and receive data from the UE 10.

The UE 10 is configured by its source cell 20S with a LWA configuration, which includes the K$_{eNB}$ parameter specific to that source eNB 20S. Conventionally that LWA configuration would be automatically deleted by the UE 10 at the hand over. In embodiments of these teachings it is not automatically deleted. When handing over the target eNB 20T gives the UE 10 a new LWA configuration, which may be an entirely new LWA configuration or only an update to its existing one. This LWA configuration from the target eNB 20T indicates to the UE 10 whether or not it should keep the set of security keys (the parameter $K_{eNB}$ is used to generate $S-K_{WT}$ which is used for both ciphering and authentication, and also to generate the PDCP encryption keys $K_{UPenc}$) that the UE used prior to the handover. For example, if the LWA configuration from the target eNB 20T includes the WT counter parameter for the target eNB this indicates the UE 10 should follow conventional practice by deleting its existing set of ciphering keys and derive new ones using that parameter (and $K_{eNB}$). If instead the LWA configuration from the target eNB 20T does not include the WT counter parameter this indicates the UE 10 should retain its existing set of security keys and continue to use them even after the handover. In this example the indication to retain the ciphering keys is implicit in the absence of the WT counter parameter from the target eNB 20T. Where this implicit indication is present, the target eNB 20T will later signal the UE 10 to delete those existing ciphering keys and derive a new set, and for example this later signaling can be an explicit indication in that the target eNB 20T sends to the UE 10 a WT counter parameter sometime after the handover is completed. In another embodiment the $S-K_{WT}$ key is retained in order to maintain the non-cellular LWA WLAN link across the hand over of the LWA cellular link but the ciphering key or keys for the PDCP PDUs ($K_{UPenc}$ for user-plane encryption) is not retained once the cellular link to the source eNB is broken.

Figure 2:
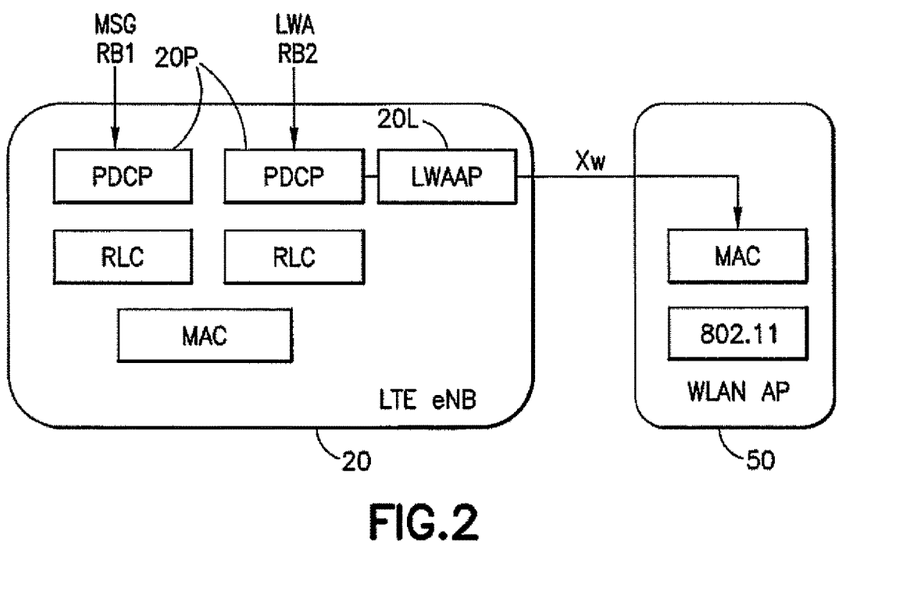
FIG. 2 is a schematic diagram showing some of the logical entities in an eNB and PDCP PDU ciphering keys that the eNB provides to the WLAN AP (via the WT) according to certain embodiments of these teachings.

In either case, data and UE context forwarding from the source cell 20S to the target cell 20T is supported at the eNB handover, as it was conventionally. And as has been discussed for eLWA in Rel-14 the UE can still be provisioned with an indication of the PDCP key used for ciphering a given packet as shown in FIG. 2. In this case provisioning of the PDCP key indication is done by the LWA AP 20L functionality of the eNB 20 which informs it to the WLAN AP 50 over the Xw interface and the WLAN AP provisions this PDCP key indication to the UE 10 over the WLAN/802.11 radio access technology link that remains intact across the cellular handover. The UE is expected to instantiate the PDCP protocol entity 20P associated to the target eNB 20T while maintaining the similar PDCP entity 20P associated to the source eNB 20S for the same bearer. In the FIG. 2 depiction there is one LWA bearer for this UE, of which the data sent on the cellular portion is shown as being sent on RB1 and the data sent on the non-cellular portion is shown as being sent on RB2.

eNB based WLAN authentication for LWA is defined in 3GPP TS 36.331 as follows:

22A.1.x WLAN Authentication

For a UE supporting LWA, WLAN authentication is performed as follows:

If WT Counter is included in LWA Configuration in the RRC Connection Reconfiguration message, the UE shall start using the $S-K_{WT}$ derived using the WT Counter value and $K_{eNB}$ as PMK as specified in TS 33.401 subclause G [22] and TS 36.331 subclause 5.6.14.2 [16]. For a UE already authenticated with WLAN, configuration of a new PMK triggers refreshing the IEEE 802.11 security using the new PMK.

If WT Counter is not included in LWA Configuration in the RRC Connection Reconfiguration message:
  if WT Counter has not been previously configured for the UE, the UE which is not already authenticated with a WLAN in the WLAN mobility set shall use authentication methods specified in TS 33.402 subclause 6 [yy];
  if WT Counter has been previously configured for the UE, the UE which is not already authenticated with a WLAN in the WLAN mobility set shall keep using the $S-K_{WT}$ previously derived using the WT Counter value and $K_{eNB}$ as PMK as specified in TS 33.401 subclause G [22] and TS 36.331 subclause 5.6.14.2 [16];
  the UE which is already authenticated with a WLAN in the WLAN mobility set continues using the previously configured authentication method and is not required to refresh IEEE 802.11 security.

Derivation of the security key is defined in 3GPP TS 33.401 as follows:

G.2.4.2 Security Key Derivation

The UE and MeNB shall derive the security key $S-K_{WT}$ of the target WT as defined in Annex A.16.

G.2.5 Security Key Update

G.2.5.1 Security Key Update Triggers

The system supports update of the $S-K_{WT}$. The MeNB may update the $S-K_{WT}$ for any reason by using the $S-K_{WT}$ update procedure defined in clause G.2. 5.2 of the current specification. If the MeNB re-keys its currently active $K_{eNB}$ in an AS security context, the MeNB shall update any $S-K_{WT}$ associated with that AS security context.

G.2.5.2 Security Key Update Procedures

If the MeNB receives a request for $S-K_{WT}$ update from the WT or decides on its own to perform $S-K_{WT}$ update (see clause G.2.5.1), the MeNB shall increment the WT Counter and compute a fresh $S-K_{WT}$, as defined in clause G.2.4. Then the MeNB shall perform a WT Modification procedure to deliver the fresh $S-K_{WT}$ to the WT. The MeNB shall provide the value of the WT Counter used in the derivation of the $S-K_{WT}$ to the UE in an integrity protected RRC message. The UE shall derive the $S-K_{WT}$ as described in clause G.2.4. Whenever the UE or WT start using a fresh $S-K_{WT}$ as PMK they shall refresh the IEEE 802.11 security.

G.2.6 Handover Procedures

During S1 and X2 handover, the LWA DRB connection between the UE and the WT is released, the UE shall delete the $S-K_{WT}$ and further keys derived based on it.

According to embodiments of these teachings, during and for a period of time after a eNB handover without a WT change for a UE configured with LWA, at least one key of a first set of security keys (for example, the existing authentication key $S-K_{WT}$ and/or the PDCP ciphering keys which for purposes herein the ciphering key(s) are also considered de-ciphering keys) are maintained with an implicit indication. In the above example this implicit indication is a lack of a WT counter parameter in the LWA configuration (update/delta) that is sent to the UE 10 by the target eNB 20T immediately after the hand over. Further, the existing $S-K_{WT}$ and PDCP ciphering keys are released with an explicit indication from the target eNB, and in one example this explicit indication is the first provisioning of a new WT counter parameter, via dedicated radio resource control (RRC) signaling from the target eNB 20T to the UE 10 at or after the handover command if the LWA configuration was maintained. In REl-13 the WT does not signal any buffer status report/indication to the target eNB across the cellular handover but in this specific embodiment it does, and such a dedicated RRC message may be triggered by at least the WT signaling of such a buffer status indication related to the PDCP PDUs that are routed from the source eNB 20S to the given UE's bearer.

In order to enable this more smoothly it is preferable that during preparations for the cellular handover there is a certain information exchange from the source eNB 20S to the target eNB 20T. This information can assist the target eNB 20T to determine if and how to maintain the current LWA configuration with this UE 10.

More specifically and referring to FIG. 1, during the handover preparation of a given UE 10 the source eNB 20S exchanges over the X2 interface with the target eNB 20T certain LWA specific information including the following.

Whether the UE 10 had a running LWA configuration for one or more bearers prior the handover event. The purpose of this is to establish whether to maintain the LWA configuration at the handover configuration.

Used WT 40 and/or UE-specific WLAN Mobility set which the UE 10 was configured in the source eNB 20S. The purpose of this is to determine whether the LWA configuration after handover could be maintained with the same WT 40.

Whether the UE 10 was using eNB-assisted WLAN authentication. This enables the target eNB 120T to determine whether the WT 40/AP 50-1/UE 10 are using a valid S-$K_{WT}$.

Additionally, during and after eNB handover without a WT change, and until indicated by the target eNB 20T, the UE 10 and WT 40/AP 50-1 retain the existing S-$K_{WT}$ (which is based on the $K_{eNB}$ of the source eNB 20S). This differs from conventional practice that would have the UE 10 and WT 40/AP 50-1 release the existing S-$K_{WT}$ at the hand over event. During this time, the UE 10 can remain connected to the same WT 40 and receive PDCP PDUs over the WLAN connection (WT-to-UE) using the S-$K_{WT}$ from the source eNB 20S. This enables the source eNB 20S to keep forwarding PDUs to the WT 40 for the UE's bearer prior to and during the handover because the WT 40 will still be capable of sending those forwarded PDUs that are buffered at the WT 40/AP 50-1 even after the handover. Absent this feature conventional practice would need to discard those (or send them un-encrypted which is not a suitable option).

From the UE perspective, the UE 10 will use the existing PDCP encryption key and PDCP entity 20P associated to the source eNB 20S, as opposed to conventional practice where the UE 10 would release it at the hand over event. During this time, the UE 10 should maintain the PDCP entity 20P associated to the source eNB 20S and forward the received (LWA) PDCP PDUs over the WLAN link to that same PDCP entity 20P. Note that in parallel also the PDCP entity 20P associated to the target eNB 20T should be created to allow LTE transmissions. This particular feature of the invention avoids the need for any indication of which PDCP keys are used, which would otherwise be necessary. This is because the PDCP encryption key being used is coupled one-to-one to the S-$K_{WT}$ key that is retained for a time after the handover; this coupling is by means of using the same $K_{eNB}$.

At the establishment of the Xw-u interface between the target eNB 20T and the WT 40 for the handed over UE's bearer (see FIG. 1), the target eNB 20T can configure the WT 40 to report the buffer status indication related to the PDCP PDUs that were routed from the source eNB 20S to a given UE's bearer. In one embodiment the target eNB 20T requests periodic updates for this buffer status indication (for example, buffer size in bytes), or in another embodiment the target eNB 20T can request event-based updates (for example, the number of PDUs in the WT's buffer for this UE's bearer falls below a pre-defined threshold). In either case identification of the UE 10 at the WT 40 in such a buffer status indication could in one example be based on the UE's media access control (MAC) address, and/or it could be based on one of the UE's 3GPP identifiers.

The WT 40 thus provides to the target eNB 20T, if and as requested, the buffer status indication for the handed over UE 10 as well as any of the LWA bearers.

Based on this buffer status indication (for example, once the buffer status indication indicates the WT's relevant buffer is empty) the target eNB 20T then provides the new WT Counter to the UE 10 via dedicated RRC signaling. At the same time the target eNB 20T can send the related new S-$K_{WT}$ key to the WT 40, where this new S-$K_{WT}$ key is generated from the target eNB's $K_{eNB}$ and the WT counter parameter that the target eNB 20T just signaled to the UE 10.

In another implementation, the new S-$K_{WT}$ key could be send to the WT 40 during the initial WT addition, but in this case the WT will normally propagate it forward to the APs 50-1, 50-2 in the mobility set only at a given time. The target eNB 20T can indicate this given time to the WT 40 implicitly, such as based on the buffer status indication (for example, the indication is implicit once the buffer fulfils a certain threshold, e.g. runs empty). Or the target eNB 20T can indicate this given time to the WT 40 explicitly, for example based on an indication from the target eNB 20T such as provisioning of the key. For example, in one embodiment the target eNB 20T can, send the new S-$K_{WT}$ to the WT 40 when the IPsec tunnel is established but the WT 40 does not immediately distribute it to the APs 50-1, 50-2 of the mobility set; the WT 40 does so only after its buffer for the handed over UE is empty of packets from the source eNB 20S.

In the above example embodiment the first reception of the WT counter at the UE 10 after the cellular handover indicates implicitly that:

a) the UE should compute a new S-$K_{WT}$ based on target eNB's $K_{eNB}$ and b) the UE should delete the PDCP entity 20P associated to the source eNB 20S and start using the entity 20P associated to the target eNB 20T.

The target eNB 20T could start routing data traffic (PDCP) PDUs to the WT 40 at any time if the WT 40 is capable of buffering, until the WT 40 provides the new S-$K_{WT}$ to the APs 50-1, 50-2 in the UE's mobility set, or alternatively only after the new S-$K_{WT}$ has been distributed by the WT 40 to the APs 50-1, 50-2 in the UE's mobility set.

Figure 3:
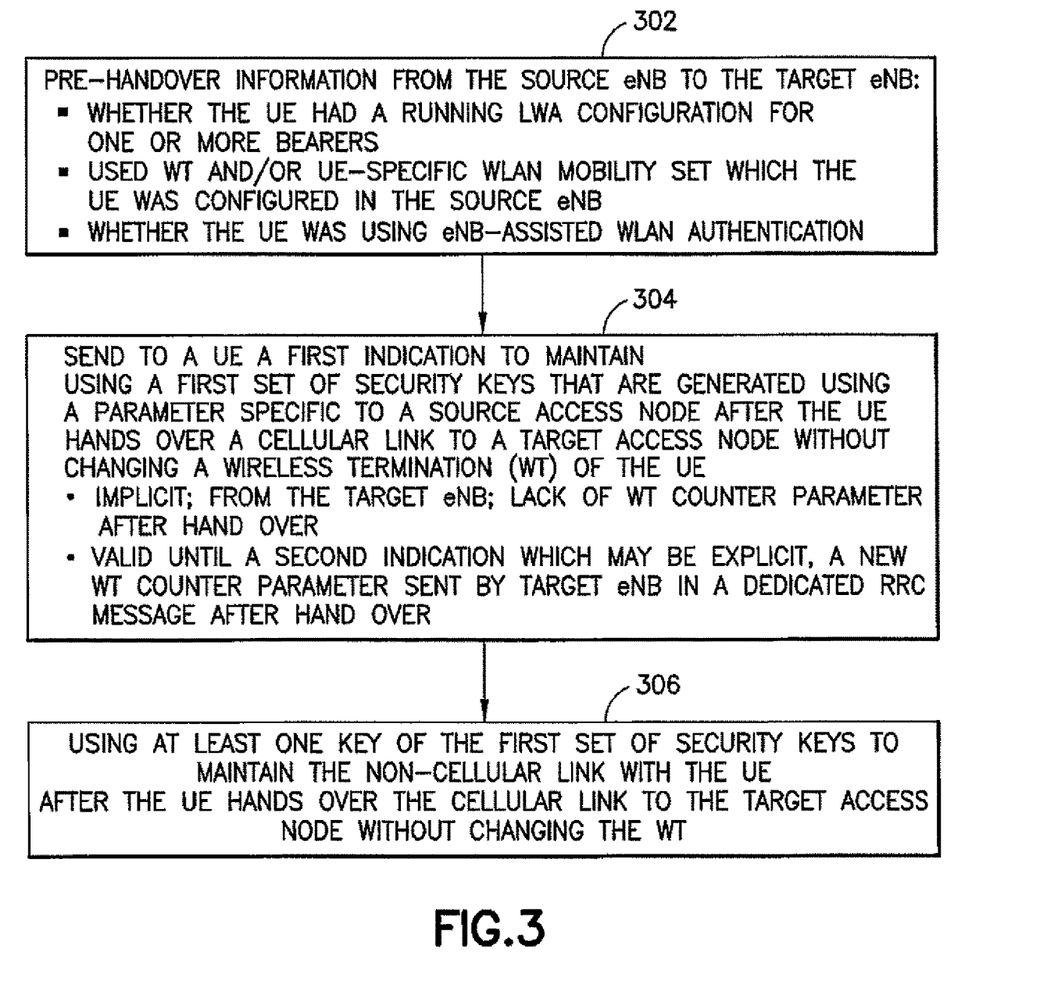
FIG. 3 is a process flow diagram showing certain features of an example embodiment.

FIG. 3 is a process flow diagram that shows certain features of non-limiting embodiments of these teachings from the perspective of the network. Firstly there is some pre-handover information sent from the source eNB 20S to the target eNB 20T which are summarized at block 302 and detailed further above. Then at block 304 the network sends to the UE 10 a first indication to maintain using a first set of security keys that are generated from a parameter that is specific for a source access node such as a source eNB 20S after the UE 10 hands over a cellular link to a target access node such as the target eNB 20T without changing a WT 40 with which the UE 10 is connected via a non-cellular link. Block 306 has (the WT via its AP) using at least one key of that same first set of security keys to maintain the non-cellular link with the UE after the UE hands over the cellular link to the target access node without changing the WT. The non-cellular link is the WLAN link between the UE 10 and the AP 50-1 in the above example where the UE 10 and the WLAN 50-1/WT 40 use the key S-$K_{WT}$ for authenticating the non-cellular link and the key $K_{UPenc}$ for ciphering the PDCP PDUs that are sent and received on the non-cellular link (both of these keys are among the first set of security keys since they are both generated using $K_{eNB}$ which is specific to the source eNB); the UE remains connected over this WLAN link from the time when the source access node sends the first indication through at least the time when the target access node sends the second indication.

Block 304 summarizes a few further details from the various examples detailed further above. In one embodiment the first indication remains valid until a second indication is sent to the UE, after which the at least one key of the first set of security keys is no longer valid for maintaining the non-cellular link. In one specific example the first indication is implicit from an absence of signaling by the target eNB 20T a pre-defined parameter in a LTE-WLAN Aggregation (LWA) configuration for the UE, such as for example absence of the WT counter parameter where the LWA configuration is signaled to the UE via a dedicated RRC message. In the above examples the second indication is an explicit one, for example a new value for the WT counter parameter sent from the target eNB 20T in dedicated RRC signaling to the UE 10. In the more specific examples above: a) the parameter specific to the source access node is $K_{eNB}$, and b) the first set of security keys include at least: b1) the at least one key which is an authentication key $S-K_{WT}$ derived from $K_{eNB}$ and WT counter, and b2) at least one ciphering key derived from $K_{eNB}$ and WT counter for encrypting and decrypting PDCP PDUs communicated with the UE over the non-cellular link.

Not specifically repeated in FIG. 3 but detailed further above, the target eNB's sending of the second indication to the UE may be triggered by the target eNB's receiving from the WT 40 a buffer status indication related to packets routed from the source access node 20S to a bearer allocated to the UE 10 that remains valid across the hand over, such as the bearer on the WLAN radio link.

To the extent FIG. 3 may be considered to represent a method, the source access node and the target access node (as well as the WLAN WT) may coordinate in performing the method in that the source access node may inform the target access node, prior to the hand over, that the UE is using eNB-assisted WLAN authentication. The target access node then uses this information to determine validity of at least one key of the first set of security keys. FIG. 3 may also represent actions performed by a wireless network when executing by one or more processors computer program instructions that are stored on a computer readable memory.

Actions from the perspective of the UE 10 are similar to those above from the network perspective. For example, the UE would in some embodiments use at least one key of a first set of security keys that are generated using a parameter that is specific to a source access node to authenticate a non-cellular link prior to the UE handing over a cellular link to a target access node. In from the above examples this non-cellular link is the WLAN link between the UE through the WLAN AP 50-1 to the WT 40. Then the UE hands over the cellular link from the source access node to the target access node, without changing a WT that remains in communication with the UE across the hand over via the non-cellular link. From the UE's perspective, only in response to the UE receiving a first indication associated with the hand over does the UE use the at least one key of the first set of ciphering keys to maintain the non-cellular link after the UE hands over the cellular link to the target access node without changing the WT. Further details correspond to those summarized from the network's perspective.

For all of the above examples the non-cellular link can change from one AP to another and still be maintained so long as both those APs are in the same mobility set; if not that would entail a change to the UE's WT. Assuming in FIG. 1 that AP 50-1 and AP 50-2 are both in the same mobility set, then while performing the cellular hand over from the source eNB 20S to the target eNB 20T the non-cellular link can be maintained, consistent with the above examples, whether the UE's non-cellular link is directly to AP 50-1 throughout or whether that non-cellular link changes from AP 50-1 to AP 50-2 because in either case the UE's WT, and hence its WLAN authentication and ciphering keys, do not change.

Figure 4:
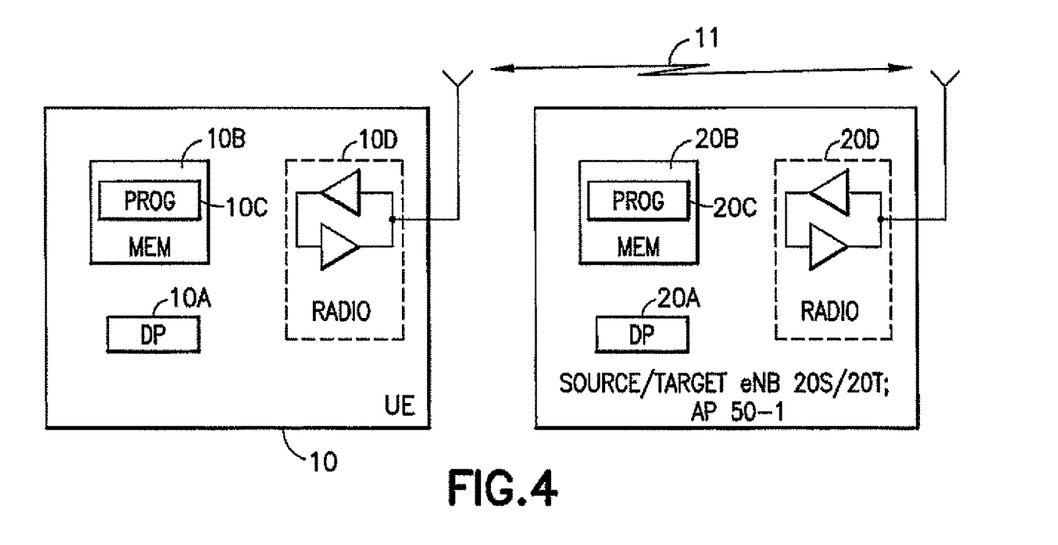
FIG. 4 is a high level schematic block diagram showing further components of the access nodes shown at FIG. 1 as well as a UE, all of which are suitable for practicing certain aspects of these teachings.

FIG. 4 is a schematic diagram illustrating some further components in addition to those already shown and described for the eNB 9 source 20S or target 20T), and further components of the UE 10. In the wireless system a wireless (LWA) network is adapted for communication over a wireless link 11 such as the described cellular bearer and WLAN bearer with an apparatus such as a mobile communication device which may be referred to as a UE 10, via cellular 20S/20T and WLAN 50-1/50-2 radio network access nodes. The network may include a network control element (MME, see FIG. 1) that may include mobility management entity/serving gateway (MME/S-GW) functionality, and which provides connectivity with a further network such as a telephone network and/or a data communications network (e.g., the Internet).

The UE 10 includes a controller, such as a computer or a data processor (DP) 10D, a computer-readable memory medium embodied as a memory (MEM) 10B that stores a program of computer instructions (PROG) 10C, one or more buffers, and a suitable wireless interface, such as radio frequency (RF) transmitter/receiver combination 10D for bidirectional wireless communications with the various access nodes 20S/20T/50-1/50-2 via one or more antennas.

The wireless link between the UE 10 and the source/target eNBs 20S/20T can use LTE RAT while that with the APs 50-1/50-2 can use WLAN RAT. Further, the UE 10 includes a galvanic or other portable power supply not shown specifically.

Each of the source/target eNBs 20S/20T as well as the AP's 50-1/50-2 also includes a controller, such as a computer or a data processor (DP) 20A, a computer-readable memory medium embodied as a memory (MEM) 20B that stores a program of computer instructions (PROG) 20C as well as the variously described buffers, and a suitable wireless interface, such as RF transmitter/receiver combination 20D for communication with the UE 10 (as well as other UEs) via one or more antennas. The source/target eNBs 20S/20T are coupled via a data/control path (not shown) to the MME and this path may be implemented as an interface. The source/target eNBs 20S/20T are also coupled to one another, and possibly to further eNBs, via another data/control path, which may be implemented in the LTE radio access technology as an X2 interface with both user plane (X-U) and control plane (X-C) instances. The APs 50-1/50-2 are coupled to the eNBs 20S/2oT via a WT 40 that has similar functionality though not necessarily the radios; the WT 40 may or may not be co-located with a given AP.

At least one of the PROGs 10C/20C is assumed to include program instructions that, when executed by the associated DP 10A/20A, enable the device to operate in accordance with exemplary embodiments of this invention as detailed above. That is, various exemplary embodiments of this invention may be implemented at least in part by computer software executable by the DP 10A of the UE 10; by the DP 20A of the source/target eNBs 20S/20T and/or WT 40 and/or APs 50-1/50-2, or by hardware or by a combination of software and hardware (and firmware).

In various exemplary embodiments the UE 10 and/or the access nodes 20S/20T/50-1/50-2 may also include dedicated processors, for example a RRC module, a radio-frequency (RF) front end, and the like. There may also be one or more modules that is/are constructed so as to operate in accordance with various exemplary embodiments of these teachings.

The computer readable MEMs 10B/20B may be of any type suitable to the local technical environment and may be implemented using any one or more suitable data storage technology, such as semiconductor based memory devices, flash memory, magnetic memory devices and systems, optical memory devices and systems, fixed memory and removable memory, electromagnetic, infrared, or semiconductor systems. Following is a non-exhaustive list of more specific examples of the computer readable storage medium/ memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The DP's 10A/20A may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., the radios 10D/20D) may be of any type suitable to the local technical environment and may be implemented using any suitable communication technology such as individual transmitters, receivers, transceivers or a combination of such components.

In general, the various embodiments of the UE 10 can include, but are not limited to, smart phones, machine-to-machine (M2M) communication devices, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Any of these may be embodied as a hand-portable device, a wearable device, a device that is implanted in whole or in part, a vehicle-mounted communication device, and the like.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into an embodiment that is not specifically detailed herein as separate from the others. Accordingly, the description is intended to embrace all such alternatives, modifications and variances which fall within the scope of the appended claims.

Below are certain acronyms used herein:
3GPP third generation partnership project
AC (WLAN) access controller
AP (WLAN) access point
eNB enhanced node B (LTE base station)
ID identifier
IPSec Internet protocol security
IW interworking
LTE long term evolution (4G cellular)
LWA LTE-WLAN aggregation
LWIP LTE-WLAN radio level integration via IPsec tunneling
MAC media access control
MME mobility management entity
PDCP packet data convergence protocol
PDU packet data unit/protocol data unit
RAN radio access network
RLC radio link control
RRC radio resource control
S-GW serving gateway
UE user equipment
WLAN wireless local area network
WT WLAN Termination

What is claimed is:

1. A method comprising:
sending to a user equipment a first indication to maintain using a first set of security keys generated from a parameter specific to a source access node after the user equipment hands over a cellular link to a target access node without changing a wireless termination with which the user equipment is connected via a non-cellular link,
wherein the first indication is implicit from an absence of signaling of at least one pre-defined parameter comprising an absence of a wireless termination counter parameter in a long term evolution wireless local area network aggregation configuration for the user equipment; and
using at least one key of the first set of security keys to maintain the non-cellular link with the user equipment after the user equipment hands over the cellular link to the target access node without changing the wireless termination,
wherein the first indication remains valid until a second indication is sent to the user equipment, after which the at least one key of the first set of security keys is no longer valid for maintaining the non-cellular link.

2. The method according to claim 1, wherein the long term evolution wireless local area network Aggregation configuration is signaled to the user equipment via a dedicated radio resource control message, the parameter specific to the source access node is $K_{eNB}$, and the first set of security keys include at least: the at least one key which is an authentication key S-$K_{WT}$ derived from $K_{eNB}$ and wireless termination counter, and at least one ciphering key derived from $K_{eNB}$ and wireless termination counter for encrypting and decrypting packet data convergence protocol packet/ protocol data units communicated with the user equipment over the non-cellular link.

3. The method according to claim 1, wherein the second indication is explicit.

4. The method according to claim 3, wherein the explicit second indication is a new value for the wireless termination counter parameter.

5. The method according to claim 1, wherein sending of the second indication to the user equipment is triggered by the target access node receiving from the wireless termination a buffer status indication related to packets routed from the source access node to a bearer allocated to the user equipment that remains valid across the hand over.

6. The method according to claim 1, wherein: the first indication is sent by the source and/or the target access node; the second indication is sent by the target access node; and the source access node and the target access node coordinate in performing the method by the source access node informing the target access node, prior to the hand over, that the user equipment is using eNB-assisted wireless local area network authentication, which the target access node uses to determine validity of at least one key of the first set of security keys.

7. A non-transitory computer readable memory storing computer program instructions that, when executed by one or more processors, cause a wireless network to perform the method according to claim 1.

8. An apparatus for communicating, the apparatus comprising:
 at least one processor; and at least one non-transitory memory storing instructions that when executed by the at least one processor cause the apparatus to perform the method according to claim 1.

9. A method for operating a user equipment (UE), the method comprising:
 using at least one key of a first set of security keys generated from a parameter specific to a source access node to authenticate a non-cellular link prior to the user equipment handing over a cellular link to a target access node; handing over the cellular link from the source access node to the target access node without changing a wireless termination in communication with the user equipment via the non-cellular link; and
 only in response to the user equipment receiving a first indication associated with the hand over, the user equipment using the at least one key of the first set of security keys to maintain the non-cellular link after the user equipment hands over to the target access node without changing the wireless termination,
 wherein the first indication is implicit from an absence of signaling of at least one pre-defined parameter comprising an absence of a wireless termination counter parameter in a long term evolution wireless local area network aggregation configuration for the user equipment,
 wherein the first indication remains valid until a second indication is received at the user equipment, after which the at least one key of the first set of security keys is no longer valid for maintaining the non-cellular link.

10. The method according to claim 9, wherein: the pre-defined parameter is a wireless termination counter, the long term evolution wireless local area network aggregation configuration is received at the user equipment via a dedicated radio resource control message, the parameter specific to the source access node is $K_{eNB}$, and the first set of security keys include at least: the at least one key which is an authentication key $S\text{-}K_{WT}$ derived from $K_{eNB}$ and wireless termination counter, and at least one ciphering key derived from $K_{eNB}$ and wireless termination counter for encrypting and decrypting packet data convergence protocol packet/protocol data units communicated with the user equipment over the non-cellular link.

11. The method according to claim 9, wherein the second indication is explicit.

12. The method according to claim 11, wherein the explicit second indication is a new value for the wireless termination counter parameter.

13. The method according to claim 9, wherein: the first indication is received from the source access node and/or the target access node; the second indication is received from the target access node; and during the method the user equipment is using eNB-assisted wireless local area network authentication.

14. A non-transitory computer readable memory storing computer program instructions that, when executed by one or more processors, cause a user equipment to perform the method according to claim 9.

15. An apparatus for communicating, the apparatus comprising: at least one processor; and at least one non-transitory memory storing instructions that when executed by the at least one processor cause the apparatus to perform the method according to claim 9.

* * * * *